(12) United States Patent
Grubwinkler

(10) Patent No.: US 11,325,601 B2
(45) Date of Patent: May 10, 2022

(54) METHOD FOR PRODUCING A PASSING PROBABILITY COLLECTION, METHOD FOR OPERATING A CONTROL DEVICE OF A MOTOR VEHICLE, PASSING PROBABILITY COLLECTING DEVICE AND CONTROL DEVICE

(71) Applicant: Continental Automotive GmbH, Hannover (DE)

(72) Inventor: Stefan Grubwinkler, Massing (DE)

(73) Assignee: Continental Automotive GmbH

( * ) Notice: Subject to any disclaimer, the term of this patent is extended or adjusted under 35 U.S.C. 154(b) by 243 days.

(21) Appl. No.: 16/611,967

(22) PCT Filed: May 3, 2018

(86) PCT No.: PCT/EP2018/061424
§ 371 (c)(1),
(2) Date: Feb. 4, 2020

(87) PCT Pub. No.: WO2018/210581
PCT Pub. Date: Nov. 22, 2018

(65) Prior Publication Data
US 2021/0129847 A1 May 6, 2021

(30) Foreign Application Priority Data
May 15, 2017 (DE) .................... 10 2017 208 168.6

(51) Int. Cl.
*B60W 30/18* (2012.01)
*B60W 40/02* (2006.01)
*B60W 40/09* (2012.01)
*G01C 21/34* (2006.01)
*G01C 21/36* (2006.01)
*G05D 1/02* (2020.01)

(52) U.S. Cl.
CPC ...... *B60W 30/18163* (2013.01); *B60W 40/02* (2013.01); *B60W 40/09* (2013.01); *G01C 21/3453* (2013.01); *G01C 21/3691* (2013.01); *G05D 1/0214* (2013.01); *B60W 2510/244* (2013.01); *B60W 2510/246* (2013.01); *B60W 2520/06* (2013.01); *B60W 2540/18* (2013.01); *B60W 2554/80* (2020.02); *B60W 2555/20* (2020.02); *B60W 2556/65* (2020.02); *G05D 2201/0213* (2013.01)

(58) Field of Classification Search
CPC ........ G05D 2201/0213; G05D 1/0214; B60W 2540/18; B60W 2510/244; B60W 2510/246; B60W 2555/20; B60W 2556/05; B60W 2556/65; B60W 40/02; B60W 40/09; B60W 2554/80; B60W 30/18163; B60W 2520/06; G08G 1/0112; G08G 1/0129; G08G 1/0141; G01C 21/3453; G01C 21/3691

USPC .......................................................... 701/22
See application file for complete search history.

(56) References Cited

U.S. PATENT DOCUMENTS

| | | |
|---|---|---|
| 9,283,963 B2 | 3/2016 | Taner |
| 2005/0246096 A1 | 11/2005 | Bracht et al. |
| 2007/0027583 A1* | 2/2007 | Tamir .................... G08G 1/164 701/1 |
| 2011/0112710 A1* | 5/2011 | Meyer-Ebeling ..... B60W 40/12 701/22 |
| 2011/0313665 A1* | 12/2011 | Lueke ................... G01S 13/931 701/301 |
| 2013/0054106 A1 | 2/2013 | Schmüdderich et al. |
| 2014/0156164 A1 | 6/2014 | Schuberth et al. |
| 2015/0142207 A1 | 5/2015 | Flehmig et al. |
| 2016/0214613 A1 | 7/2016 | Herzhauser et al. |
| 2016/0238404 A1 | 8/2016 | Okada et al. |
| 2016/0318511 A1* | 11/2016 | Rangwala .............. G08G 1/162 |
| 2017/0031361 A1* | 2/2017 | Olson ............... B60W 30/0953 |
| 2018/0365996 A1 | 12/2018 | Profendiner et al. |
| 2019/0054922 A1* | 2/2019 | Yai ................. B60W 30/18163 |
| 2019/0291728 A1* | 9/2019 | Shalev-Shwartz ......................... B60W 30/165 |
| 2020/0109955 A1* | 4/2020 | Prabhudeva ....... G01C 21/3407 |
| 2021/0070286 A1* | 3/2021 | Green .................. B60W 30/09 |
| 2021/0094577 A1* | 4/2021 | Shalev-Shwartz ........ G06T 7/20 |

FOREIGN PATENT DOCUMENTS

| | | | |
|---|---|---|---|
| AU | 2017100399 A4 * | 5/2017 | ....... G08G 1/096725 |
| CN | 101124103 A | 2/2008 | |
| CN | 105593497 A | 5/2016 | |

(Continued)

OTHER PUBLICATIONS

German Examination Report for German Application No. 10 2017 208 168.6, dated Jan. 4, 2018, 7 pages.

(Continued)

*Primary Examiner* — Atul Trivedi
(74) *Attorney, Agent, or Firm* — RatnerPrestia

(57) ABSTRACT

A method for producing an overtaking probability collection, having the following steps: recording a respective driving characteristic in a multiplicity of motor vehicles passing through at least one route section at a geographical position; assigning the respective motor vehicles to overtaking vehicles or to non-overtaking vehicles on the basis of the respective driving characteristic; determining a ratio between the overtaking vehicles and the non-overtaking vehicles; and entering the ratio into the overtaking probability collection as an overtaking probability for the route section at the geographical position.

15 Claims, 3 Drawing Sheets

(56) References Cited

FOREIGN PATENT DOCUMENTS

| CN | 105593643 A | | 5/2016 | |
| CN | 105788369 A | | 7/2016 | |
| CN | 112537295 A | * | 3/2021 | ........ B60W 40/072 |
| DE | 102014008380 A1 | | 12/2014 | |
| DE | 102014002116 A1 | * | 8/2015 | ........ G01S 13/931 |
| DE | 102015015944 A1 | | 6/2017 | |
| EP | 1591754 A1 | | 11/2005 | |
| EP | 2479077 A1 | | 7/2012 | |
| GB | 2578912 A | * | 6/2020 | .......... B60W 60/00 |
| GB | 2579021 A | * | 6/2020 | ...... B60W 60/0015 |
| JP | 2009298269 A | | 12/2009 | |
| JP | 2012123625 A | | 6/2012 | |
| JP | 2015075398 A | | 4/2015 | |
| KR | 1020090057528 A | | 6/2009 | |
| KR | 1020150058030 A | | 5/2015 | |
| KR | 20210016926 A | * | 2/2021 | ............ H04W 4/46 |
| WO | 2006037360 A1 | | 4/2006 | |
| WO | WO-2011140993 A1 | * | 11/2011 | ............ B60K 28/10 |
| WO | 2015052577 A1 | | 4/2015 | |
| WO | WO-2015096878 A1 | * | 7/2015 | ............ B60W 30/09 |
| WO | WO-2015120953 A1 | * | 8/2015 | ............ G01S 13/931 |
| WO | WO-2017054956 A1 | * | 4/2017 | ............ G08G 1/0112 |
| WO | WO-2018072240 A1 | * | 4/2018 | .............. G08G 1/08 |
| WO | WO-2019089591 A | * | 5/2019 | ...... B60W 60/00274 |
| WO | WO-2019233719 A1 | * | 12/2019 | ............ B60W 50/14 |

OTHER PUBLICATIONS

Korean Notice to Submit Response for Korean Application No. 10-2019-7035892, dated Mar. 26, 2021 with translation, 11 pages.
International Search Report and Written Opinion for International Application No. PCT/EP2018/061424, dated Aug. 1, 2018, 10 pages.
Wilde, A., "Eine Modulare Funktionsarchitektur für Adaptives und Vorausschauendes Energiemanagement in Hybridfahrzeugen", Informatik—Forschung und Entwicklung, Jan. 1, 2010, 164 pages.
Japanese Notice of Reasons for Refusal for Japanese Application No. 2019-563135, dated Feb. 18, 2021 with translation, 14 pages.
Chinese Office Action with Search Report for Chinese Application No. 201880047185.8, dated Jun. 23, 2021, with translation, 24 pages.

* cited by examiner

METHOD FOR PRODUCING A PASSING PROBABILITY COLLECTION, METHOD FOR OPERATING A CONTROL DEVICE OF A MOTOR VEHICLE, PASSING PROBABILITY COLLECTING DEVICE AND CONTROL DEVICE

CROSS REFERENCE TO RELATED APPLICATIONS

This application is the U.S. National Phase Application of PCT International Application No. PCT/EP2018/061424, filed May 3, 2018, which claims priority to German Patent Application No. 10 2017 208 168.6, filed May 15, 2017, the contents of such applications being incorporated by reference herein.

FIELD OF THE INVENTION

The invention relates to a method for producing an overtaking probability collection. Furthermore, the invention relates to methods for operating a control device of a motor vehicle, to an overtaking probability collecting device having a corresponding overtaking probability collection and to a corresponding control device at least for preparing an overtaking maneuver of a motor vehicle having a main energy store and a drive unit.

BACKGROUND OF THE INVENTION

A fundamental concept in the present case is that modern hybrid vehicles involve overtaking maneuvers usually being assisted by the switching-in of an electric machine or an additional electrical torque as a convenience function. It is important to the operating strategy to predict overtaking maneuvers, since this allows the torque of the electric machine to be reduced in good time before the overtaking maneuver, so that there is a sufficiently high torque available in the electric machine at the beginning of the overtaking maneuver. Furthermore, the prediction can enable the electric machine not to overheat during the overtaking maneuver, and can enable an energy content of an electrical energy store of the vehicle to be sufficient for the overtaking maneuver.

Usually, overtaking maneuvers are predicted by evaluating vehicle-internal sensor signals, such as for example actuation of the turn signal, steering angle, shifting down to a lower gear, distance from the vehicle in front or relative speed in relation to the vehicle in front. These vehicle-internal signals are used to calculate an overtaking probability. This overtaking probability is taken as a basis for adapting the operating strategy of the hybrid vehicle.

SUMMARY OF THE INVENTION

An aspect of the present invention is a way in which an overtaking probability collection is produced more reliably and/or a motor vehicle can be operated more safely.

The method according to an aspect of the invention involves an overtaking probability collection being produced. The following steps are performed:
  recording a respective driving characteristic from a multiplicity of motor vehicles passing through at least one route section at a geographical position;
  assigning the respective motor vehicles to overtaking vehicles and/or to non-overtaking vehicles on the basis of the respective (actual) driving characteristic;
  determining a ratio between the overtaking vehicles (or the numbers thereof) and the non-overtaking vehicles (or the numbers thereof); and
  entering the ratio (or a value reflecting this ratio) into the overtaking probability collection as an overtaking probability for the route section at the geographical position.

An aspect of the invention is based on the insight that overtaking maneuvers are performed by motor vehicles individually. As such, an overtaking tendency of one driver of the motor vehicle differs from an overtaking tendency of another driver of a further motor vehicle, for example. This overtaking tendency may further be dependent on the situation of the driver and also on the traffic density; a driver may be less inclined to overtake at the weekend than on workdays on his way to work, and the inclination to overtake may furthermore also be dependent on traffic densities on a driver-individual basis. Furthermore, there will be for example route sections on which only a few motor vehicles overtake and there will also be route sections on which relatively many motor vehicles overtake. Solely on the basis of map data, this information cannot be recorded with a high level of precision. Maps do not usually indicate buildings or visibility, as can arise owing to corn fields or trees. In the present case, this information is collected by monitoring the multiplicity of motor vehicles and is added to the overtaking probability collection, in particular a database. The overtaking probability collection is thus produced empirically in the present case. This allows the overtaking probability to be ascertained more individually and more precisely.

The respective driving characteristic is recorded. This means for example that a driving trajectory (trajectory relative to the route, trajectory relative to the overtaken vehicle and/or temporal steering angle characteristic) of the respective motor vehicle is recorded. However, the driving characteristic can for example also be recorded by virtue of the respective motor vehicles being tracked merely on the basis of positions that exist at certain points and, in this case, it being established that one motor vehicle places itself in front of (or beside) the other motor vehicle. As such, the motor vehicles can be recorded for example by means of identification numbers, in particular by a mobile radio unit of the motor vehicle or of a driver of the motor vehicle. However, the driving characteristic can for example also be recorded in remote sensing data, for example in aerial images or satellite images. To this end, the motor vehicles can be extracted from the images or an image sequence, for example. The motor vehicles may for example also be equipped with navigation satellite receivers and can transmit their position to a receiving device. Multiple positions can then be used to determine the driving characteristic.

The driving characteristic can furthermore be recorded by a further vehicle, for example by means of sensor data and/or by means of a camera signal of the further vehicle, in particular a vehicle following the overtaking vehicle. In other words, the overtaking maneuver can also be recorded by the car behind, for example by the camera system thereof or sensors that belong to a driver assistance system, in particular, and that are able to ascertain a keeping-in-lane behavior or overtaking behavior of the vehicle in front.

An overtaking maneuver can additionally or alternatively also be determined by evaluating sensor data from at least one sensor of the respective motor vehicle itself. As such, the evaluation allows for example determination of when the respective motor vehicle overtakes and when it does not overtake. The sensor data can be prescribed for example by an accelerator pedal position, a steering angle, a directionof-travel indicator status and/or surroundings information, in particular radar sensor data and/or laser scanner data and/or camera, in particular stereo camera.

There may also be provision for the sensor data recorded by the motor vehicle to be sent for evaluation to a vehicle-external device, in particular an overtaking probability collecting device, or to at least one other motor vehicle. However, it may also be that the evaluation takes place in the respective motor vehicle in which the sensor data are recorded, and preferably only the evaluation result is transmitted to the vehicle-external device.

The multiplicity of motor vehicles (non-overtaking vehicles and overtaking vehicles, or vehicles for which a possible overtaking maneuver is considered) can be available as a vehicle fleet, for example.

The respective driving characteristic is used to determine whether the respective motor vehicle has overtaken another motor vehicle or another road user on this route section. This can be established for example by recording the order of two motor vehicles at the start of the route section and recording the order of the two motor vehicles once again at the end of the route section. If the order has changed, the motor vehicle that was in second place first and is now in first place, i.e. must have passed the further motor vehicle, can be assigned to the class of overtaking vehicles. If the order of the motor vehicles on the route section has not changed, the motor vehicle is in particular assigned to the class of non-overtaking vehicles.

In particular, the ratio between the number of overtaking vehicles and the number of non-overtaking vehicles is determined. The ratio is in particular a numerical relationship between the number of overtaking vehicles and the number of non-overtaking vehicles, that is to say for example a percentage value. The ratio can alternatively be determined on the basis of a weighting value.

The ratio in particular provides information about how many motor vehicles from the multiplicity of motor vehicles on this route section overtake at this geographical position. The ratio is then entered into the overtaking probability collection as the overtaking probability for this route section. It can be entered as a database entry, for example.

Preferably, there is provision for the recording of the respective driving characteristic to involve recording a respective time of day for which the respective driving characteristic is recorded, and for the motor vehicles to be categorized into time-of-day classes on the basis of the time of day and for a respective time-of-day-class-dependent ratio to be determined and for the respective time-of-day-class-dependent ratio to be entered into the overtaking probability collection for the route section. The time of day in this case is in particular an hour. The time of day may alternatively prescribe a specific period of the day or else a day of the week or else a season or else varied time information. The time-of-day-dependent ratio allows an overtaking behavior differing according to the time of day to be recorded, for example. As such, it may be for example that at peak times with a high volume of traffic, for example in the morning and in the evening, when commuter traffic reaches its peak levels, overtaking takes place more often than is the case at another time of day. The time-of-day-class-dependent ratio can be entered into the overtaking probability collection in addition or as an alternative to the time-independent ratio, for example.

Furthermore, there is preferably provision for the recording of the respective driving characteristic to involve recording a respective weather condition for which the respective driving characteristic is recorded, and for the motor vehicles to be categorized into weather condition classes on the basis of the weather condition and for a respective weather-condition-class-dependent ratio to be determined and for the respective weather-condition-class-dependent ratio to be entered into the overtaking probability collection for the route section. The weather condition describes for example an air temperature, a road temperature, a rainy condition, a snowy weather condition, a brightness condition, a foggy condition, a road condition, in particular a wet road or a freezing road. Preferably, there are multiple weather condition classes into which the recorded motor vehicles can be categorized. The weather-condition-class-dependent ratio can in turn be entered into the overtaking probability collection in addition or as an alternative to the ratio without dependence on the weather condition.

Furthermore, there is preferably provision for the recording of the respective driving characteristic to involve recording a respective visibility for which the respective driving characteristic is recorded, and for the motor vehicles to be categorized into visibility classes on the basis of the visibility and for a respective visibility-class-dependent ratio to be determined and for the respective visibility-class-dependent ratio to be entered into the overtaking probability collection for the route section. Visibility describes how far a driver of the motor vehicle can see into the distance in the current ambient condition. As such, for example the presence of fog adversely affects visibility, which is why a motor vehicle overtaking in fog is categorized into a different visibility class than a motor vehicle overtaking in fog-free visibility, for example. Visibility can also differ by virtue of different brightnesses, rain, snowfall or light influences, for example. Visibility can also describe the extent to which a surroundings recording sensor of a motor vehicle is capable of recording the surrounding area.

Furthermore, there is preferably provision for the respective driving characteristic of the multiplicity of motor vehicles to be recorded on multiple different route sections at different geographical positions and for a plurality of the ratios to be determined for the different route sections and for an overtaking probability map to be produced using the plurality of ratios at the different geographical positions. The overtaking probability map allows the plurality of ratios to be visualized as overtaking probabilities. Furthermore, the overtaking probability map allows at least one attribute of at least one geo-information system to be added to the overtaking probabilities. As such, for example a road attribute can be added to the overtaking probability map. The road attribute can then for example describe the road category to which the route section is assigned or else the construction condition that the route section is in. As such, the route section can have a damaged road or else be in a condition of construction or repair, for example. The overtaking probability map provides a general overtaking probability, in particular. This means that when a motor vehicle is moved onto a route section that the overtaking probability map contains, for example, the overtaking probability that is currently available for the motor vehicle at the current position on the basis of the overtaking probability map can be output therefor. The location of the motor vehicle on the overtaking probability map can be determined on the basis of a GNSS (global navigation satellite system) receiver, for example.

Furthermore, there is preferably provision for an individual overtaking behavior of a driver of a motor vehicle to be compared with the, in particular other, overtaking probabilities of the overtaking probability collection and for the driver to be assigned on the basis of the comparison to an, in particular location-independent, overtaking probability class having a driving-class-specific driving style value that describes an inclination of the driver to take risks during an overtaking maneuver. As such, the driver can be assigned the driving style value, for example, by virtue of his current driving behavior or overtaking behavior being compared with the overtaking probabilities from the overtaking probability collection. If the driver travels along the route section at the geographical position, for example, it is possible to recognize how the driver behaves towards the motor vehicles from the overtaking probability collection. If this is then compared on multiple different route sections, in particular, the driver can be assigned to a location-independent overtaking probability class. The overtaking probability class then indicates for example whether this is a risk-inclined driver, i.e. a driver willing to overtake, or a safety-conscious driver, i.e. a driver less willing to overtake. There may thus be multiple overtaking probability classes, for example, and each of the overtaking probability classes is assigned a different driving style, in particular. The driving style value describes the willingness of the driver to take risks during the overtaking maneuver. The driving style value can be available as a weighting factor, for example. The overtaking probability can then be combined with the driving style value arithmetically, for example. An advantage of the driving style value is that a current position of the motor vehicle is no longer necessary for the application. The driving style value allows the driver to be categorized as a safety-conscious driver, for example, and the motor vehicle can be operated on the basis of this categorization for future overtaking maneuvers. The position of the motor vehicle is intended in particular just for determining the individual overtaking behavior, in order to perform the comparison with the overtaking probability collection. The driving style value can then be used independently of location, that is to say without knowledge of the position.

An aspect of the invention also relates to a method for operating a control device of a motor vehicle. In contrast to the method above, which involves collecting the overtaking probabilities, the method described below relates in complementary fashion to the use of these collected data to assist an overtaking maneuver. This method involves an overtaking probability map being read in by the motor vehicle. The overtaking probability map is produced on the basis of an overtaking probability collection having at least one entered overtaking probability, in particular in accordance with the method described above. The overtaking probability in turn is determined on the basis of a ratio between overtaking vehicles and non-overtaking vehicles, also in particular in accordance with the method described above. A control signal of the motor vehicle is output on the basis of the overtaking probability map.

The overtaking probability map can be read in from a motor-vehicle-internal memory, for example, that stores the overtaking probability map. The overtaking probability map can also be read in from a motor-vehicle-external server, however, that stores the overtaking probability map. The motor vehicle is then preferably coupled to the motor-vehicle-external server wirelessly.

The control signal then allows for example advice to be output to a driver of the motor vehicle or else a control intervention can take place in at least one component of a drivetrain of the motor vehicle.

Furthermore, an aspect of the invention relates to a method for operating a control device of a motor vehicle, in which a driving style value, i.e. a numerical value or another symbol characterizing the driving style, which driving style value is produced on the basis of an overtaking probability collection having at least one entered overtaking probability, is read in by the motor vehicle, wherein the overtaking probability is determined on the basis of a ratio between overtaking vehicles and non-overtaking vehicles, and the control signal of the motor vehicle is output on the basis of the driving style value.

The driving style value in turn describes a willingness of a driver of the motor vehicle to take risks during an overtaking maneuver. The driving style value can in turn be read in from a motor-vehicle-internal memory or else from a vehicle-external device coupled to the motor vehicle wheel, for example.

The control signal in turn allows advice to be output to the driver, or else a component of a drivetrain of the motor vehicle can be controlled on the basis of the control signal.

In particular, the motor vehicle can be operated at least semi-autonomously on the basis of the control signal.

Preferably, there is provision for the control signal to prescribe a target state-of-charge value and/or a target temperature of a main energy store and/or a target drive torque of a drive unit of the motor vehicle. The control signal can prescribe for example the target state-of-charge value or at least one target state-of-charge range, so that there is sufficient energy available for an imminent overtaking maneuver, for example. As such, the energy store can be recharged by an internal combustion engine, for example, so that the latter can provide sufficient energy for the electric motor for the overtaking maneuver, or the motor vehicle can be operated more economically before the overtaking maneuver. It is also possible for in particular the target temperature of the main energy store to be prescribed by the control signal. As such, the motor vehicle can for example also prepare an imminent overtaking maneuver recognized on the basis of the overtaking probability map and/or the driving style value. Since the overtaking maneuver usually involves up to a maximum of the available power being requested at least intermittently, it is necessary for the main energy store, prior to an overtaking maneuver, to have a temperature that is below the target temperature or a temperature limit value so that the energy can be provided for the overtaking maneuver as desired. Additionally or alternatively, the target drive torque of the drive unit and the control signal can also be prescribed, that is say in particular when an overtaking maneuver is recognized as imminent on the basis of the overtaking probability map and/or the driving style value.

The motor vehicle is in particular in the form of a hybrid vehicle having an electric motor and an internal combustion engine. The energy store is in particular intended for the electric motor. The drive unit is preferably in the form of an electric motor. The control signal allows the motor vehicle to be prepared for an imminent overtaking maneuver.

Furthermore, there is preferably provision for a target vehicle in front to be overtaken by the motor vehicle on the basis of the control signal. As such, the motor vehicle can also be controlled by the control signal such that an overtaking maneuver is at least partly dependent on the control signal. By way of example, the motor vehicle can be operated at least semi-autonomously, i.e. for example intervention in an acceleration device or a deceleration device of the motor vehicle can be effected by means of the control signal.

Furthermore, there is preferably provision for a steering angle and/or a distance from the target vehicle and/or an activity of a direction-of-travel indicator unit of the motor vehicle to be taken into account when overtaking. The evaluation of the further vehicle-internal signals such as steering angle, distance and activity of the direction-of-travel indicator unit allows the overtaking maneuver, which is performed on the basis of the overtaking probability map and/or the driving style value, to be performed more safely once again. The reason is that the steering angle and/or the distance and/or the activity of the direction-of-travel indicator unit allow(s) the overtaking probability to be adapted and therefore once again predicted more accurately for the respective current situation.

An aspect of the invention also relates to an overtaking probability collecting device having an overtaking probability collection produced in accordance with the method according to an aspect of the invention. The overtaking probability collecting device is in particular in the form of a vehicle-external server. The server may be formed from multiple distributed server units or else be available centrally as a single unit, for example.

The overtaking probability collecting device has in particular an interface to which at least one motor vehicle can make a wireless coupling or connection and that can be used to transmit at least some of the data of the overtaking probability collection.

The overtaking probability collection is in particular in the form of a database.

An aspect of the invention also relates to a control device for at least preparing an overtaking maneuver of a motor vehicle having a main energy store and a drive unit, which has an interface configured to be actuated by means of a control signal of a method according to an aspect of the invention for operating a control device.

The motor vehicle is preferably in the form of a hybrid vehicle having an electric motor and an internal combustion engine.

Advantageous embodiments of the methods according to an aspect of the invention can be considered to be advantageous embodiments of the overtaking probability collecting device or the control device.

Further features of an aspect of the invention emerge from the claims, the figures and the description of the figures. The features and feature combinations cited in the description above and the features and feature combinations cited in the description of the figures below and/or shown in the figures alone are usable not only in the respectively indicated combination but also in other combinations or on their own, without departing from the scope of an aspect of the invention.

BRIEF DESCRIPTION OF THE DRAWINGS

Exemplary embodiments of an aspect of the invention will be explained in more detail below on the basis of schematic drawings.

In the drawings.

In the figures, identical or functionally identical elements are provided with identical reference signs.

DETAILED DESCRIPTION OF THE PREFERRED EMBODIMENTS

Figure 1:
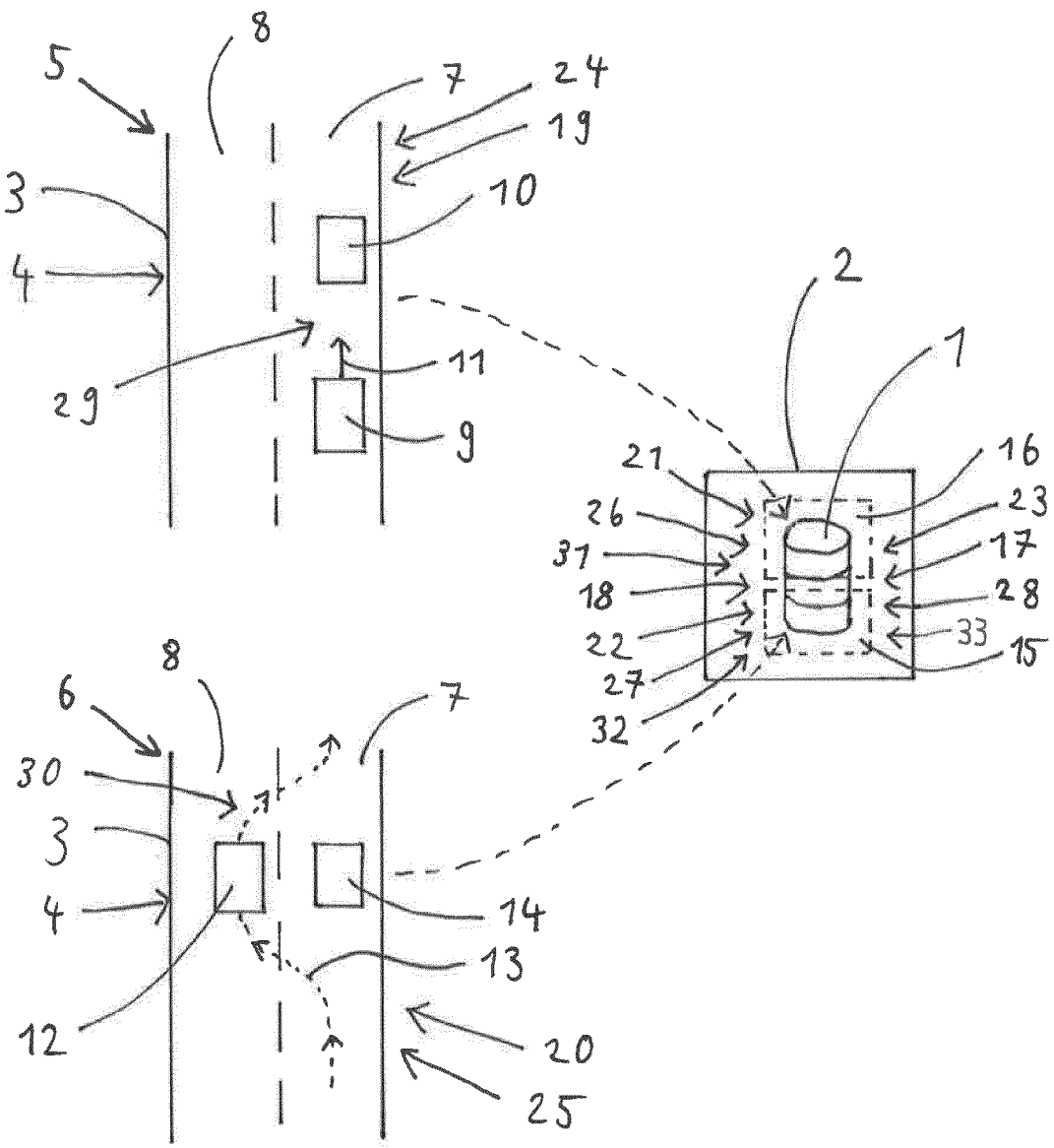
FIG. 1 shows a schematic depiction of an exemplary embodiment of a method according to an aspect of the invention for producing an overtaking probability collection.

FIG. 1 shows, in exemplary fashion, an approach to producing an overtaking probability collection 1. The overtaking probability collection 1 is in particular in the form of a database, for example in the form of a relational database, and, in accordance with the exemplary embodiment, stored in an overtaking probability collecting device 2. The overtaking probability collecting device 2 is in the form of a server, for example. The overtaking probability collecting device 2 may be in central or distributed form, for example, so that it has different subunits present at different geographical locations, for example. The overtaking probability collecting device 2 can also be referred to as a backend.

A route section 3 at a geographical position 4 is shown. The route section 3 is shown at a first time 5 and at a second time 6. In accordance with the exemplary embodiment, the first time 5 is different than the second time 6. The route section 3 is in particular any road section that, for example as shown in the exemplary embodiment, has a first lane 7 and a second lane 8. The first lane 7 and the second lane 8 may be designed for opposing traffic or else traffic in the same direction.

A first motor vehicle 9 is shown on the route section 3 at the first time 5. Furthermore, a first target vehicle 10 is shown on the route section 3 at the first time 5. The first target vehicle 10 is arranged in front of the first motor vehicle 9 and, in accordance with the exemplary embodiment, is moved in the same direction as the motor vehicle 9.

A first driving characteristic 11 is recorded in the first motor vehicle 9. The first driving characteristic 11 in this case may be a driving trajectory of the first motor vehicle 9 or else merely a positional relationship or an order between the first motor vehicle 9 and the first target vehicle 10. The first driving characteristic 11 can be used to determine whether the first motor vehicle 9 overtakes the first target vehicle 10.

A second motor vehicle 12 travels on the route section 3 at the second time 6. The second motor vehicle 12 may be different than or identical to the first motor vehicle 9. Preferably, the second motor vehicle 12 is different than the first motor vehicle 9, however. The second motor vehicle 12 has a second driving characteristic 13 analogously to the first driving characteristic 11. The second driving characteristic 13 is used to recognize that the second motor vehicle 12 overtakes a second target vehicle 14.

As a result of the first motor vehicle 9 and the second motor vehicle 12, there are a multiplicity of motor vehicles. It is alternatively possible for multiple driving characteristics to be recorded from further motor vehicles on the route section 3.

The respective driving characteristic 11, 13 is then used to assign the motor vehicles 9, 12 either to an overtaking vehicles class 15 or to a non-overtaking vehicles class 16. In accordance with the exemplary embodiment from FIG. 1, the first motor vehicle 9 is assigned to the non-overtaking vehicles class 16, for example, while the second motor vehicle 12 is assigned to the overtaking vehicles class. The assignment to the respective class 15, 16 is made in particular in the overtaking probability collecting device 2, preferably after the driving characteristics 11, 13 are transmitted to the overtaking probability collecting device 2. The assignment to the respective class 15 can alternatively be made in the respective motor vehicle 9, 12 itself, so that just the respective class 15, 16 is transmitted to the overtaking probability collecting device 2.

In particular, the motor vehicles 9, 12 may be coupled to the overtaking probability collecting device 2, in order to transmit the respective driving characteristic 11, 13 or else the respective class 15, 16.

The information about overtaking vehicles 15 and non-overtaking vehicles 16 can alternatively be determined on the basis of mobile radio data or other features comprehensible from an overtaking maneuver between motor vehicles. It may thus be the case that the motor vehicles 9, 12 are no longer at all coupled to the overtaking probability collecting device 2, since the information about the motor vehicles 9, 12 in regard to their overtaking status is obtained from vehicle-external monitoring, for example from methods of remote sensing.

A ratio 17 is determined between the overtaking vehicles 15 and the non-overtaking vehicles 16. The ratio 17 can be available as a percentage value, for example. Furthermore, the ratio 17 is entered into the overtaking probability collection 1 as an overtaking probability 18 for the route section 3. Preferably, the overtaking probability collection 1 is produced by entering the overtaking probability 18 for the first time.

Additionally or alternatively, recording of the first driving characteristic 11 then involves a first time of day 19 being recorded and recording of the second driving characteristic 13 involves a second time of day 20 being recorded. The times of day 19, 20 in this case may be hours or periods of the day, for example. The first time of day 19 and the second time of day 20 may be identical or else also different. In accordance with one exemplary embodiment, the first time of day 19 and the second time of day 20 are different, so that the first time of day 19 is categorized into a first time-of-day class 21 and the second time-of-day 20 is categorized into a second time-of-day class 22. The first motor vehicle 9 is therefore also categorized into the first time-of-day class 21 and the second motor vehicle 12 is categorized into the second time-of-day class 22. The time-of-day classes 21, 22 can then be used to determine a time-of-day-class-dependent ratio 23. The time-of-day-class-dependent ratio 23 can be determined as the overtaking probability 18 or as a further overtaking probability that is entered into the overtaking probability collection 1 besides the overtaking probability 18. In particular, the overtaking probability 18 or the time-of-day-class-dependent overtaking probability can then be determined for each of the different times of day 19, 20.

Furthermore additionally or alternatively, the recording of the first driving characteristic 11 additionally involves a first weather condition 24 being recorded, while the recording of the second driving characteristic 13 involves a second weather condition 25 being recorded. The recorded driving characteristics 11, 13 and the recorded motor vehicles 9, 12 can then be categorized into weather condition classes on the basis of the weather conditions 24, 25. As such, the first motor vehicle 9 with the first weather condition 24 can be classified into a first weather condition class 26, for example, and the second motor vehicle 12, which is recorded under the second weather condition 25, can be categorized into a second weather condition class 27. The weather-condition classes 26, 27 can then be used to determine a weather-class-dependent ratio 28 analogously to the ratio 17.

Analogously to the time-of-day-class-dependent ratio 23, the weather-condition-class-dependent ratio 28 can likewise be entered into the overtaking probability collection as the overtaking probability 18 or else can be entered into the overtaking probability collection in addition to the overtaking probability 18.

The weather condition records for example a rainy condition or an extent of a rainy condition or an extent of sunlight or an outside temperature status.

Furthermore additionally or alternatively, the recording of the respective driving characteristic 11, 13 involves a visibility being recorded too. As such, for example the first driving characteristic 11 records a first visibility 29 too and the second driving characteristic 13 involves a second visibility 30 being recorded too. The visibility 29, 30 is then categorized into at least a first visibility class 31 or a second visibility class 32 for the times of day 19, 20 and the weather conditions 24, 25. Furthermore, a visibility-class-dependent ratio 33 is then in particular determined in each of the visibility classes 31, 32. The visibility-class-dependent ratio 33 is determined analogously to the time-of-day-class-dependent ratio 23 or the weather-condition-class-dependent ratio 28.

The visibility 29, 30 describes how far a driver of the respective motor vehicle 9, 12 can see the traffic situation in front of him or in the direction of travel or the surrounding area in the direction of travel and/or can recognize objects, in particular obstacles, therein. The respective visibility 29, 30 can alternatively describe for example how far a surroundings recording sensor of the respective motor vehicle 9, 12 can record obstacles situated in surroundings in the direction of travel of the respective motor vehicle 9, 12. A radar sensor, for example, is sensitive to weather in a different manner than for example a camera in the visible spectral range.

The overtaking probability collection 1 finally allows an indication of what the overtaking probability 18 is like in numerical terms in the route section 3. It is thus possible to indicate how probable it is that a motor vehicle passing through the route section 3 will perform an overtaking maneuver. The overtaking probability 18 can be indicated in particular for the time-of-day classes 21, 22, the weather-condition classes 26, 27 and the visibility classes 31, 32.

In particular, the respective driving characteristic 11, 13 is recorded on multiple different route sections at different geographical positions. A resultant plurality of ratios of overtaking vehicles 15 to non-overtaking vehicles 16 can be used to produce an overtaking probability map 34 for the different route sections—as shown in the exemplary embodiment from FIG. 2.

The overtaking probability map 34 is available as a collection for which different overtaking probabilities 18 on different route sections 3 are entered on the basis of their geographical position.

When producing the overtaking probability map 34, at least one attribute 35 of a geo-information system 36 can be added to the overtaking probability map 34. The attribute 35 may be for example a road category describing the route section 3. The attribute 35 may alternatively otherwise be various other information about the surroundings through which the route section 3 leads. As such, the attribute can for example also describe a road condition, buildings or vegetation. The attribute 35 also comprises the number of lanes present, for example.

The overtaking probability map 34 can then be provided to a further motor vehicle by the overtaking probability collecting device 2, for example.

Figure 2:
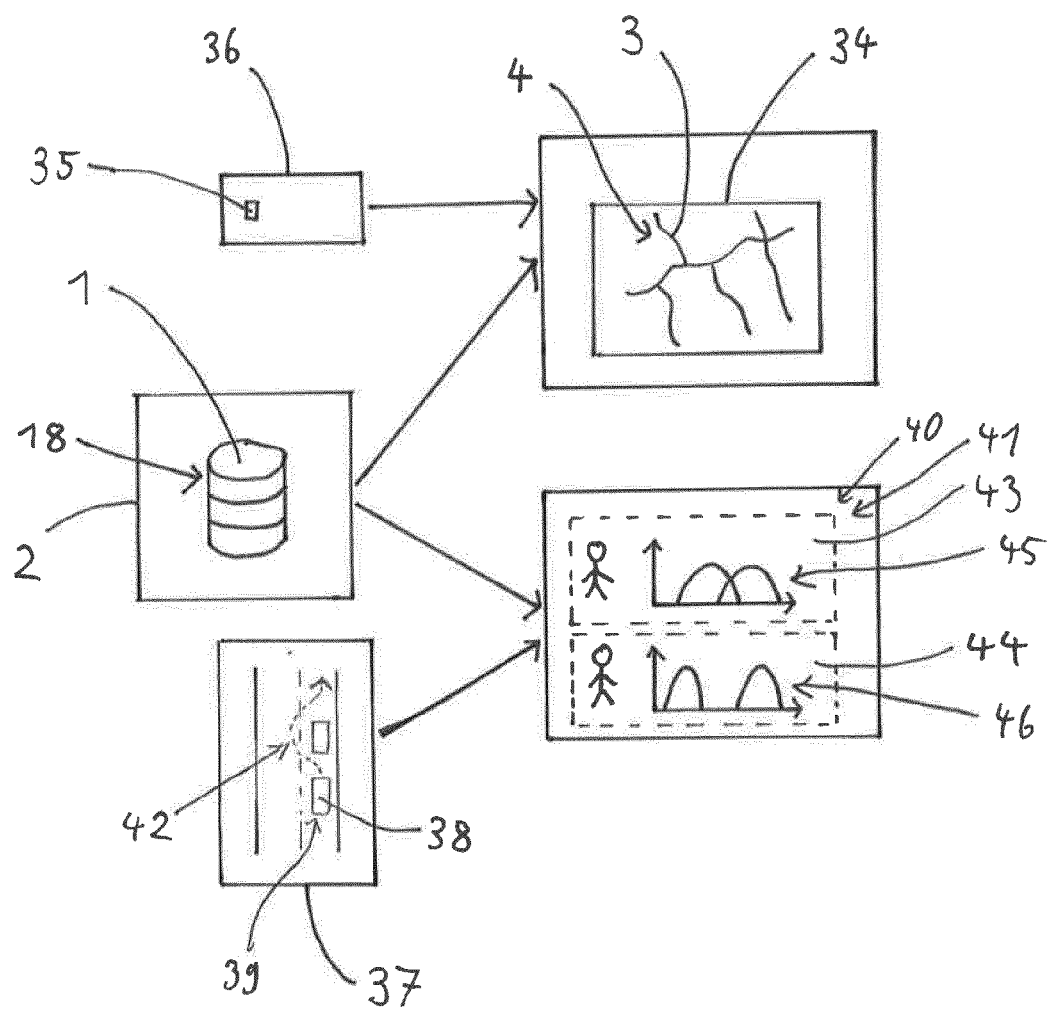
FIG. 2 shows a schematic depiction of the method, in which the overtaking probability collection is used to produce an overtaking probability map and/or to assign a driver of a motor vehicle to an overtaking probability class.

FIG. 2 alternatively shows how an individual overtaking behavior 37 of a driver 38 of a third vehicle 39 is recorded and compared with the overtaking probabilities 18. The third motor vehicle 39 may be identical to or different than the first motor vehicle 9 or than the second motor vehicle 12 in this case. The comparison of the overtaking behavior 37 with the overtaking probability 18 is used to assign the driver 38 to a location-independent overtaking probability class 40. Preferably, there are multiple overtaking probability classes 40. Each of the overtaking probability classes 40 has a class-specific driving style value 41. The driving style value 41 describes a willingness of the driver 38 to take risks during an overtaking maneuver 42. The driving style value 41 can be prescribed as a weighting factor, for example.

In accordance with the exemplary embodiment from FIG. 2, the driver 38 is assigned either to a first overtaking probability class 43 or to a second overtaking probability class 44. In accordance with the exemplary embodiment, the first overtaking probability class 43 has a first driving style value 45 and the second overtaking probability class 44 has a second driving style value 46.

Figure 3:
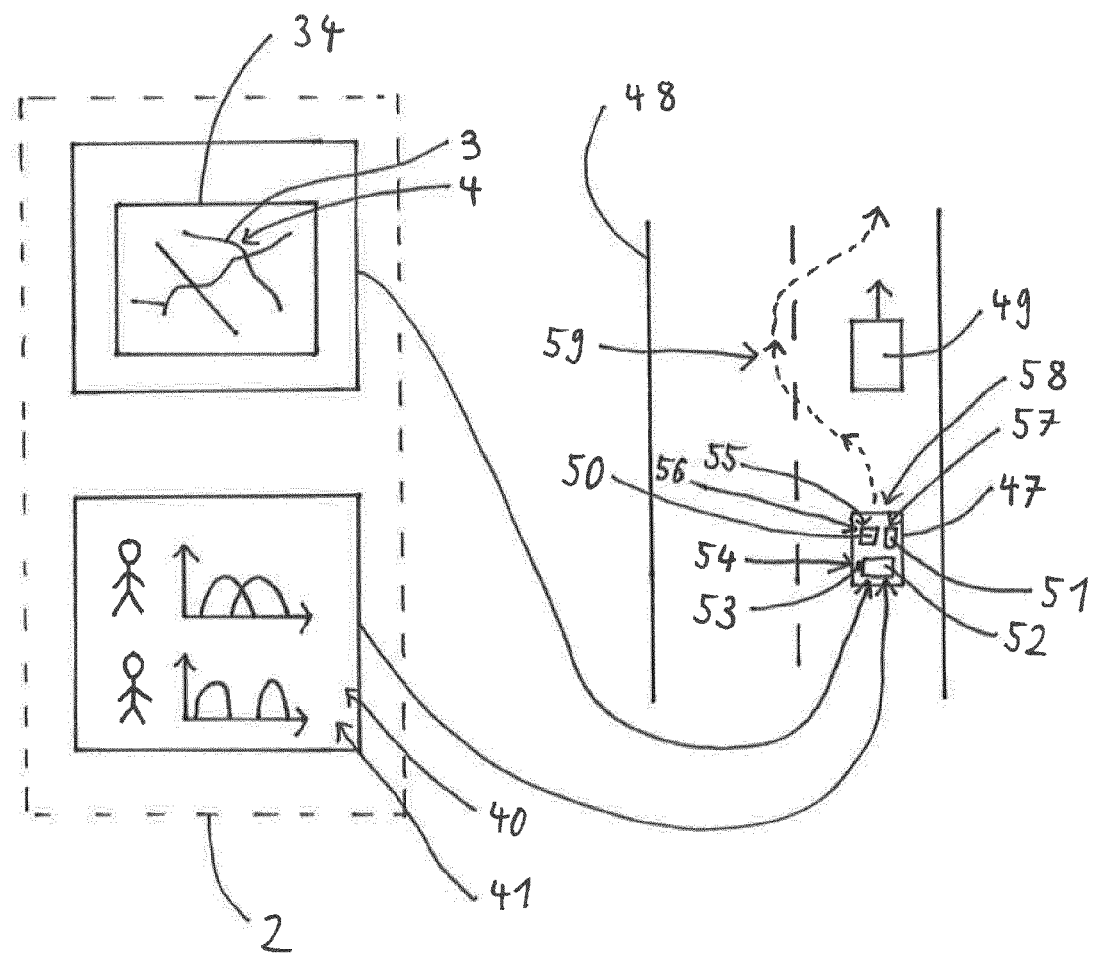
FIG. 3 shows a schematic depiction of an exemplary embodiment of a method according to an aspect of the invention for operating a control device that outputs a control signal on the basis of the overtaking probability map and/or the driving style value.

FIG. 3 shows a fourth motor vehicle 47 on a road 48. A third target vehicle 49 is traveling in front of the fourth motor vehicle 47.

The fourth motor vehicle 47 has a main energy store 50 and a drive unit 51. In accordance with the exemplary embodiment, the fourth motor vehicle 47 is in the form of a hybrid vehicle and the drive unit 51 is in the form of an electric motor supplied with power by the main energy store 50.

Furthermore, the fourth motor vehicle 47 has a control device 52. The control device 52 is in the form of an overtaking maneuver preparation device or in the form of an overtaking maneuver assistance apparatus, for example. The control device 52 has an interface 53 that can be actuated by means of a control signal 54.

In accordance with one exemplary embodiment, the operation of the control device 52 involves the overtaking probability map 34 being read in and the control signal 54 is output on the basis of the overtaking probability map 34. The control signal 54 then allows for example advice to be output in the fourth motor vehicle 47, or else it is possible for control intervention to take place in the fourth motor vehicle 47.

Additionally or alternatively, the control device 52 can be operated by virtue of the driving style value 41 being read in and the control signal 54 being output on the basis of the driving style value 41.

The control signal that is output on the basis of the overtaking probability map 34 or the driving style value 31 then allows for example a target state-of-charge value 55 and/or a target temperature 56 of the main energy store 50 and/or a target drive torque 57 of the drive unit 51 to be prescribed.

As such, for example the overtaking probability map and/or the driving style value can be taken as a basis for recognizing that a further driver 58 of the fourth motor vehicle 47 probably wishes to initiate an overtaking maneuver 59. If the probability of this assumption is high on the basis of the overtaking probability map, that is to say if the fourth motor vehicle 47 is moving on the route section 3 with the geo-position 4, and/or the driving style value 41, that is to say the further driver 58 has for example an above-average inclination to overtake, regardless of location, then the control signal 54 is output in order to prepare the overtaking maneuver 59. To prepare the overtaking maneuver, for example, it makes sense to ensure that the main energy store 50 has enough power and that the main energy store 50 has a present temperature that permits power for the overtaking maneuver to be drawn to the envisaged extent. The control signal 54 also already allows a lower gear to be selected, for example, in order to be prepared for the overtaking maneuver 59. It is alternatively possible for the target drive torque 57 of the drive unit 51 to be prescribed, so that the drive unit 51 is prepared for the overtaking maneuver 59.

The fourth motor vehicle 47 may be different than or identical to the third motor vehicle 39 or the first motor vehicle 9 or the second motor vehicle 12. The motor vehicle 47 therefore allows the overtaking probability map 34 and/or the driving style value 41 to be applied, and at the same time allows a contribution to be made to determining or adapting the overtaking probability 18.

The control signal 54 is thus output on the basis of an expected overtaking probability. The expected overtaking probability is determined using at least one method of machine learning or statistics, for example. The inclusion of the overtaking probability 18 in the preparation or performance of overtaking maneuvers 59 operates the motor vehicle 47 more safely.

The willingness to overtake in specific situations is dependent on the individual driving style. Calculation of the driver-specific overtaking probabilities allows the overtaking preparation measures and/or the overtaking maneuver to be adapted to the individual driving behavior of the further driver 58.

A further advantage of the overtaking probability collection 1 is the increase in the look-ahead distance or the prediction horizon. The vehicle-internal signals usually used allow the overtaking probability to be determined only shortly before the overtaking maneuver, which is too short a term for adapting the operating strategy, e.g. increasing the state of charge of a traction battery. The server-based approach provided by the overtaking probability collecting device 2 allows the positions to be determined several km in advance, which means that the components in the drivetrain can be actuated in good time.

LIST OF REFERENCE SIGNS

1 Overtaking probability collection
2 Overtaking probability collecting device
3 Route section
4 Geographical position
5 First time
6 Second time
7 First lane
8 Second lane
9 First motor vehicle
10 First target vehicle
11 First driving characteristic
12 Second motor vehicle
13 Second driving characteristic
14 Second target vehicle
15 Overtaking vehicles
16 Non-overtaking vehicles
17 Ratio
18 Overtaking probability
19 First time of day
20 Second time of day
21 First time-of-day class
22 Second time-of-day class
23 Time-of-day-class-dependent ratio
24 First weather condition
25 Second weather condition
26 First weather-condition class
27 Second weather-condition class 28 Weather-class-dependent ratio
29 First visibility
30 Second visibility
31 First visibility class
32 Second visibility class
33 Visibility-class-dependent ratio
34 Overtaking probability map
35 Attribute
36 Geo-information system
37 Overtaking behavior
38 Driver
39 Third motor vehicle
40 Overtaking probability class
41 Driving style value
42 Overtaking maneuver
43 First overtaking probability class
44 Second overtaking probability class
45 First driving style value
46 Second driving style value
47 Fourth motor vehicle
48 Road
49 Third target vehicle
50 Main energy store
51 Drive unit
52 Control device
53 Interface
54 Control signal
55 Target state-of-charge value
56 Target temperature
57 Target drive torque
58 Further driver
59 Overtaking maneuver

The invention claimed is:

1. A method for producing an overtaking probability collection, comprising:
   recording, by sensor of a vehicle, a respective driving characteristic from a multiplicity of motor vehicles passing through at least one route section at a geographical position;
   assigning the respective motor vehicles to a first class of overtaking vehicles or to a second class of non-overtaking vehicles on the basis of the respective driving characteristic;
   determining, by a server, a ratio between a first number of the motor vehicles assigned to the first class of the overtaking vehicles and a second number of the motor vehicles assigned to the second class of the non-overtaking vehicles;
   entering, by the server, the ratio into the overtaking probability collection as an overtaking probability for the route section at the geographical position, the overtaking probability indicating the probability of the vehicle performing an overtaking procedure in the route section at the geographical position;
   transmitting, by the server, the overtaking probability for the route section at the geographical position to the vehicle; and
   controlling, by a vehicle controller, operation of the vehicle based on the overtaking probability for the route section at the geographical position.

2. The method as claimed in claim 1, wherein
   the recording of the respective driving characteristic involves recording a respective time of day for which the respective driving characteristic is recorded, and the motor vehicles are categorized into time-of-day classes on the basis of the time of day and a respective time-of-day-class-dependent ratio is determined and the respective time-of-day-class-dependent ratio is entered into the overtaking probability collection for the route section.

3. The method as claimed in claim 2, wherein the recording of the respective driving characteristic involves recording a respective weather condition for which the respective driving characteristic is recorded, and the motor vehicles are categorized into weather-condition classes on the basis of the weather condition and a respective weather-condition-class-dependent ratio is determined and the respective weather-condition-class-dependent ratio is entered into the overtaking probability collection for the route section.

4. The method as claimed in claim 1, wherein
   the recording of the respective driving characteristic involves recording a respective weather condition for which the respective driving characteristic is recorded, and the motor vehicles are categorized into weather-condition classes on the basis of the weather condition and a respective weather-condition-class-dependent ratio is determined and the respective weather-condition-class-dependent ratio is entered into the overtaking probability collection for the route section.

5. The method as claimed in claim 1, wherein
   the recording of the respective driving characteristic involves recording a respective visibility for which the respective driving characteristic is recorded, and the motor vehicles are categorized into visibility classes (31, 32) on the basis of the visibility and a respective visibility-class-dependent ratio is determined and the respective visibility-class-dependent ratio is entered into the overtaking probability collection for the route section.

6. The method as claimed in claim 1, wherein
   the respective driving characteristic of the multiplicity of motor vehicles is recorded on multiple different route sections at different geographical positions and a plurality of the ratios are determined for the different route sections and an overtaking probability map is produced using the plurality of ratios at the different geographical positions.

7. The method as claimed in claim 1, wherein
   an individual overtaking behavior of a driver of a motor vehicle is compared with the overtaking probabilities of the overtaking probability collection, and the driver is assigned on the basis of the comparison to an overtaking probability class having a class-specific driving style value that describes an inclination of the driver to take risks during an overtaking maneuver.

8. An overtaking probability collecting device having an overtaking probability collection produced in accordance with a method as claimed in claim 1.

9. A method for operating a control device of a motor vehicle, the method comprising:
   recording, by sensor of a vehicle, a respective driving characteristic from a multiplicity of motor vehicles passing through at least one route section at a geographical position;
   assigning the respective motor vehicles to a first class of overtaking vehicles or to a second class of non-overtaking vehicles on the basis of the respective driving characteristic;

determining, by a server, a ratio between a first number of the motor vehicles assigned to the first class of the overtaking vehicles and a second number of the motor vehicles assigned to the second class of the non-overtaking vehicles;

entering, by the server, the ratio into the overtaking probability collection as an overtaking probability for the route section at the geographical position, the overtaking probability indicating the probability of the vehicle performing an overtaking procedure in the route section at the geographical position based on the ratio between overtaking vehicles and non-overtaking vehicles;

transmitting, by the server, the overtaking probability for the route section at the geographical position to the vehicle; and controlling, by a vehicle controller, operation of the vehicle based on an overtaking probability map produced based on the overtaking probability.

10. The method as claimed in claim 9,
wherein
the control signal prescribes at least one of a target state-of-charge value of a main energy store, a target temperature of the main energy store, or a target drive torque of a drive unit of the motor vehicle.

11. The method as claimed in claim 9,
wherein
a target vehicle in front is overtaken by the motor vehicle on the basis of the control signal.

12. The method as claimed in claim 11,
wherein
a steering angle and/or a distance from the target vehicle and/or an activity of a direction-of-travel indicator unit of the motor vehicle is/are taken into account when overtaking.

13. A control device for at least preparing an overtaking maneuver of a motor vehicle having a main energy store and a drive unit, which has an interface configured to be actuated by a control signal output as claimed in claim 9.

14. A method for operating a control device of a motor vehicle, the method comprising:

recording, by sensor of a vehicle, a respective driving characteristic from a multiplicity of motor vehicles passing through at least one route section at a geographical position;

assigning the respective motor vehicles to a first class of overtaking vehicles or to a second class of non-overtaking vehicles on the basis of the respective driving characteristic;

determining, by a server, a ratio between a first number of the motor vehicles assigned to the first class of the overtaking vehicles and a second number of the motor vehicles assigned to the second class of the non-overtaking vehicles;

entering, by the server, the ratio into the overtaking probability collection as an overtaking probability for the route section at the geographical position, the overtaking probability indicating the probability of the vehicle performing an overtaking procedure in the route section at the geographical position based on the ratio between overtaking vehicles and non-overtaking vehicles;

transmitting, by the server, the overtaking probability for the route section at the geographical position to the vehicle; and controlling, by a vehicle controller, operation of the vehicle based on a driving style value produced based on the overtaking probability, the driving style value describes an inclination of a driver of the vehicle to take risks during an overtaking maneuver.

15. The method as claimed in claim 14, wherein the control signal prescribes at least one of a target state-of-charge value of a main energy store, a target temperature of the main energy store, or a target drive torque of a drive unit of the motor vehicle.

* * * * *